Aug. 4, 1959  R. B. LESLIE, JR., ET AL  2,897,861
PINEAPPLE SIZER AND ERADICATOR
Filed Feb. 21, 1956  5 Sheets-Sheet 4
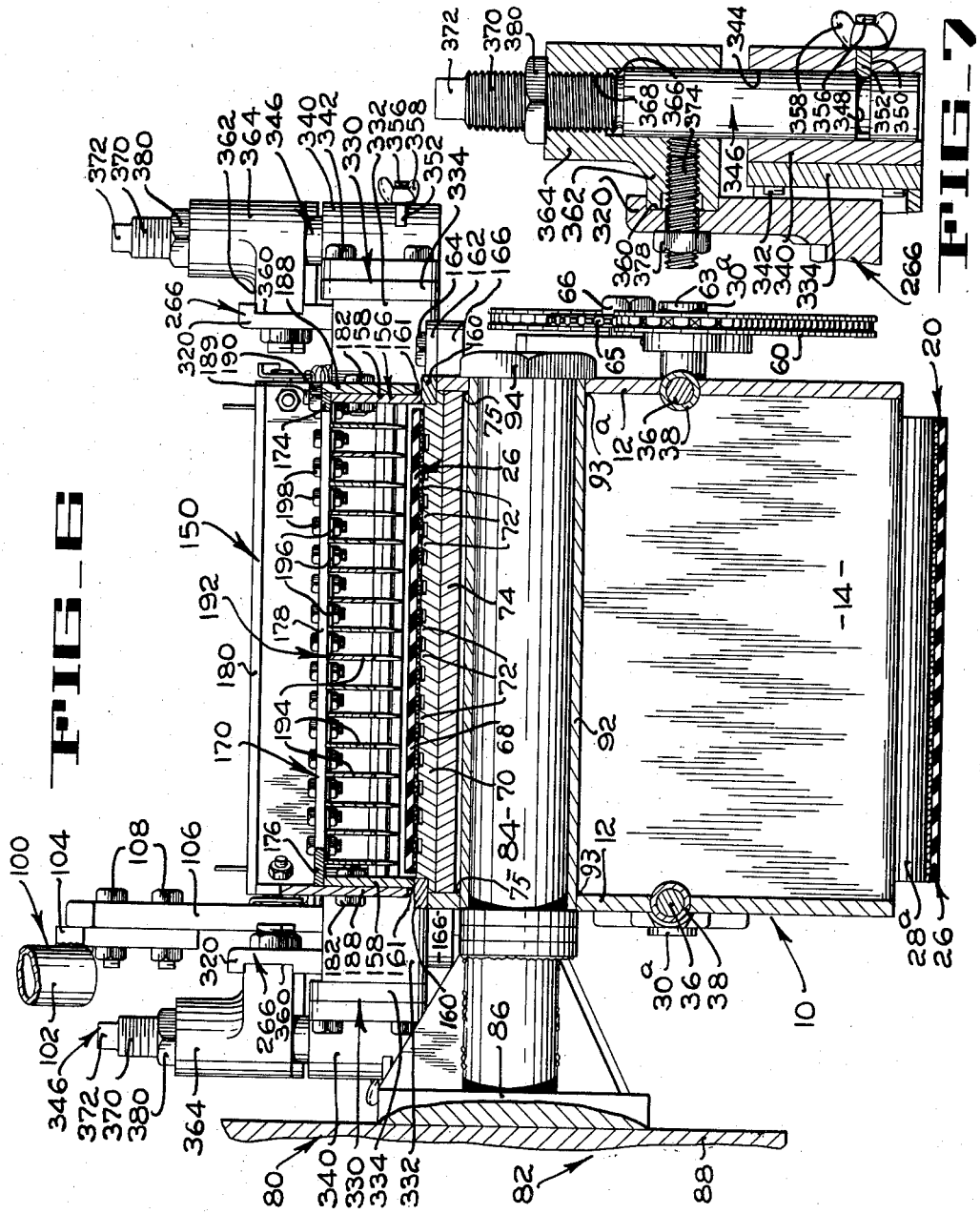
INVENTORS
RICHARD B. LESLIE, JR.
LESLIE VADAS
BY Hans G. Hoffmeister
ATTORNEY

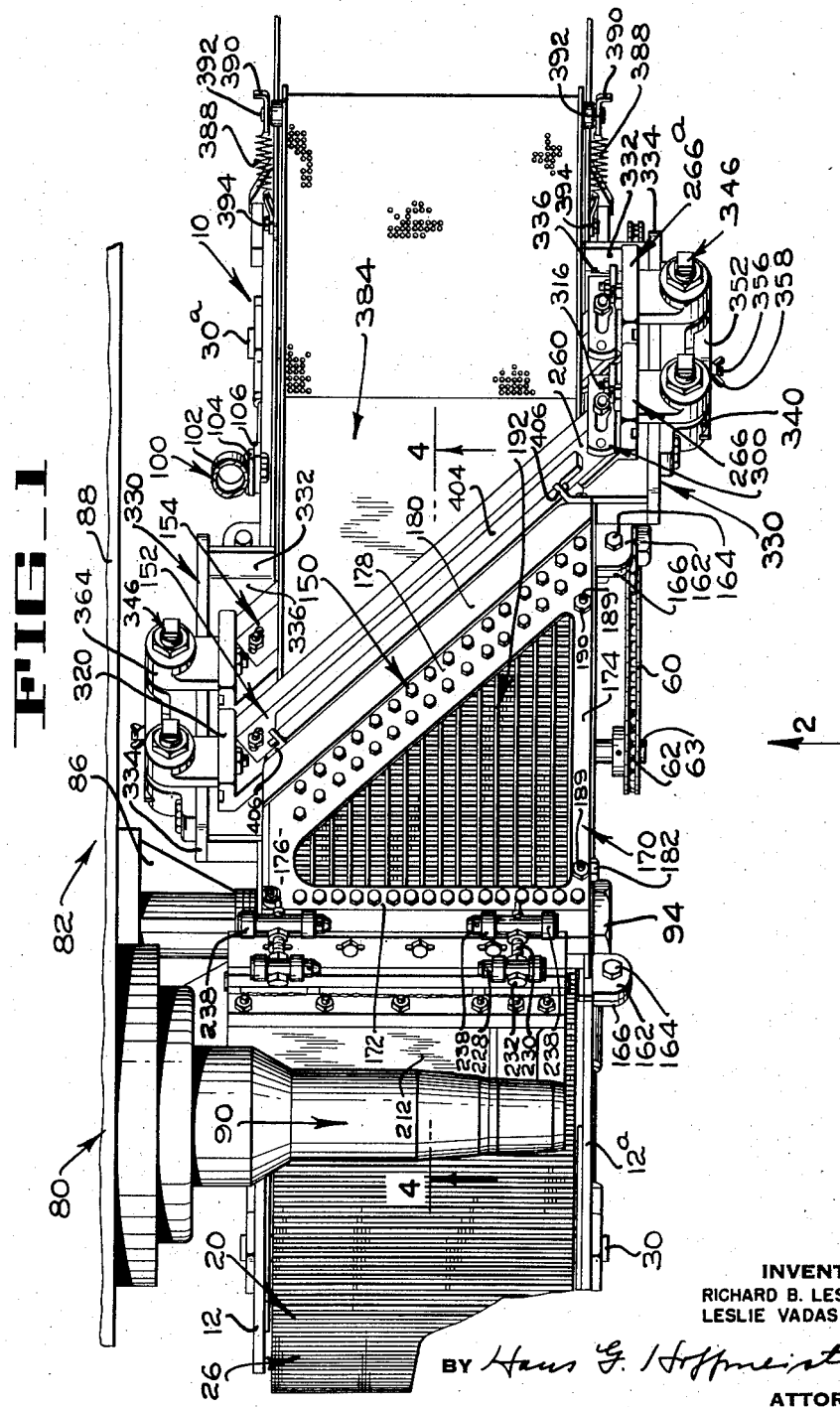

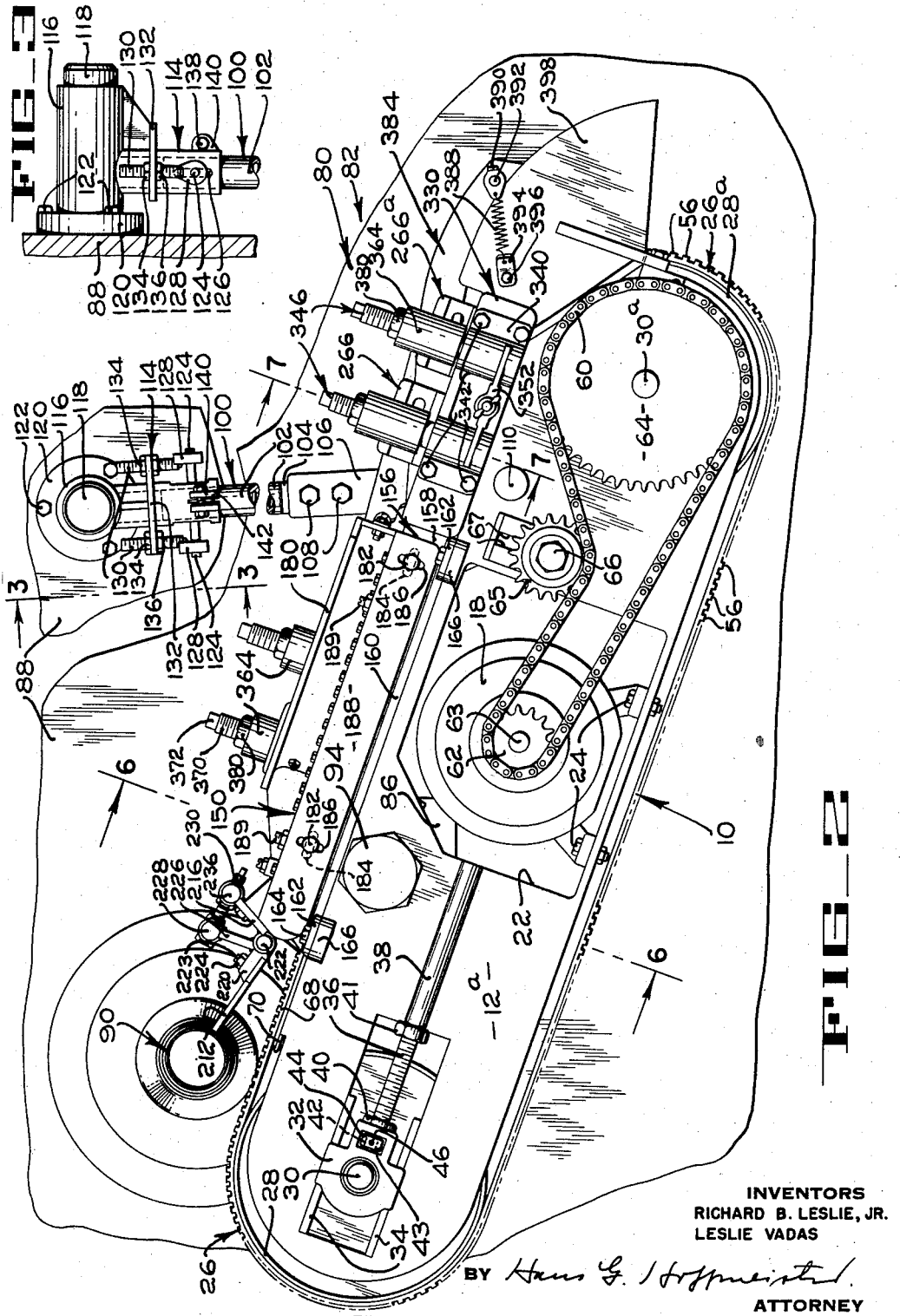

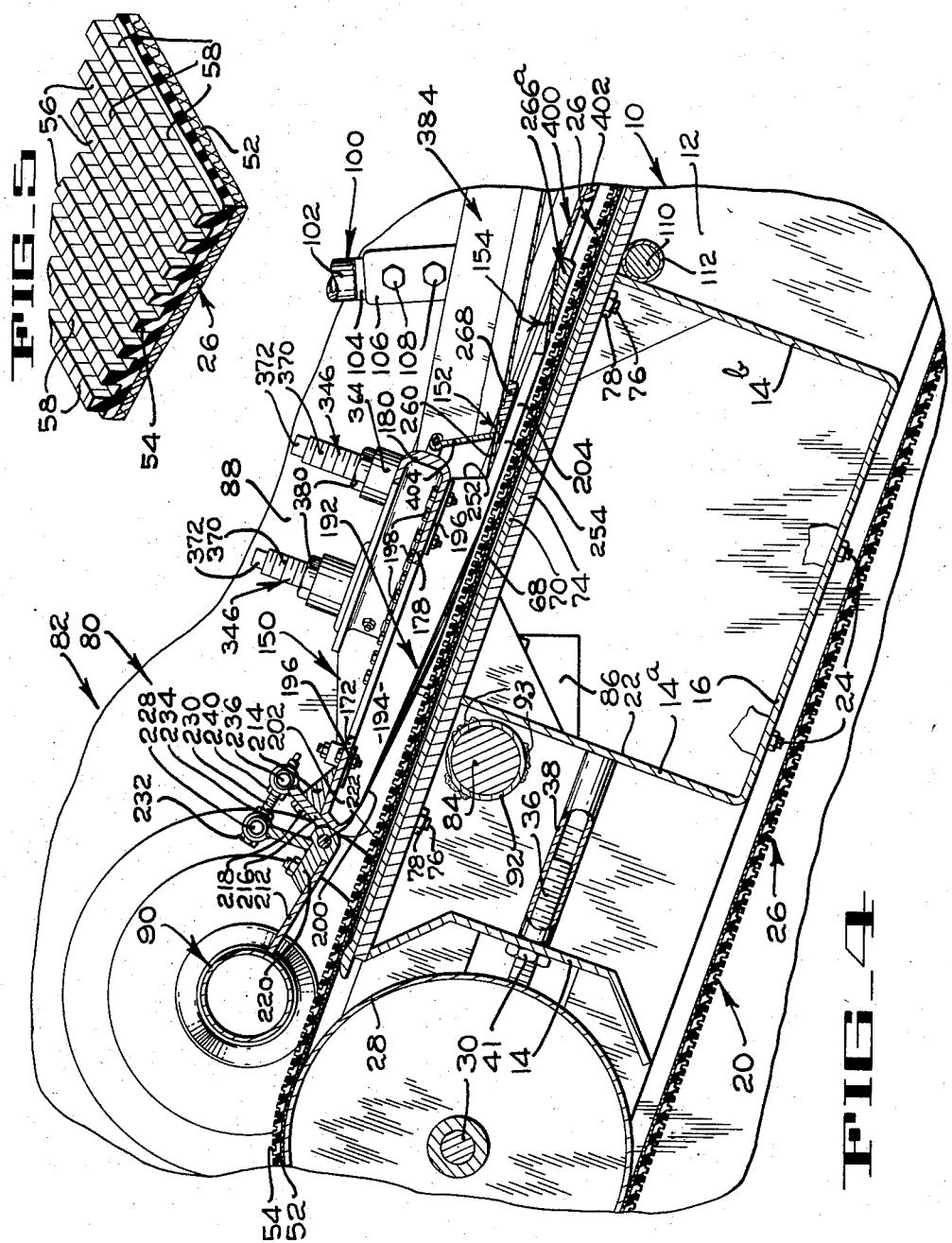

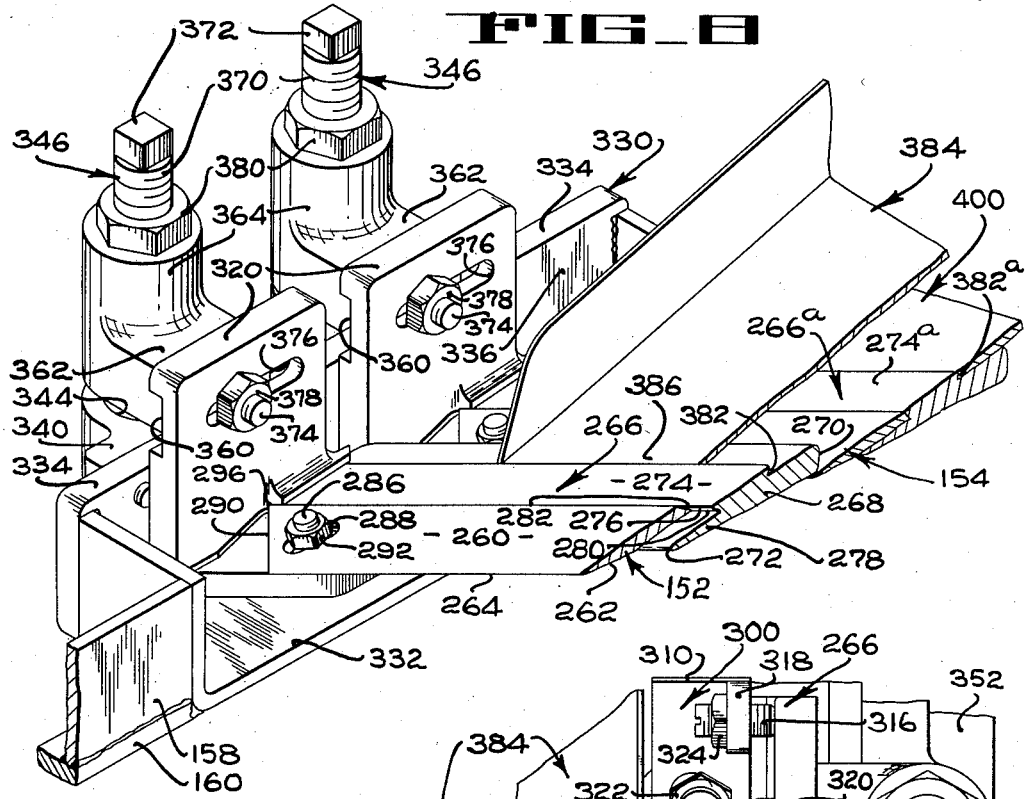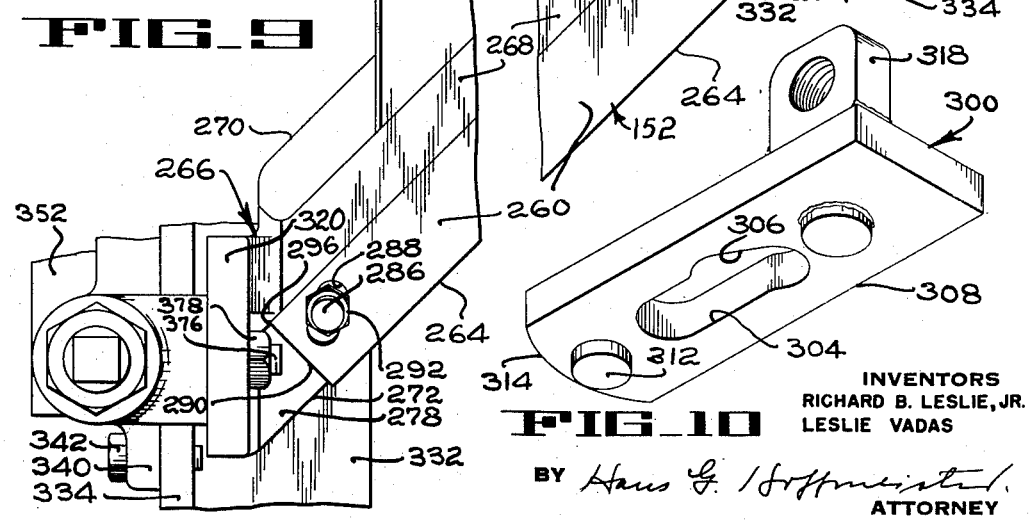

United States Patent Office 2,897,861
Patented Aug. 4, 1959

2,897,861

PINEAPPLE SIZER AND ERADICATOR

Richard B. Leslie, Jr. and Leslie Vadas, Los Gatos, Calif., assignors to Food Machinery and Chemical Corporation, San Jose, Calif., a corporation of Delaware Application February 21, 1956, Serial No. 566,882

10 Claims. (Cl. 146—6)

This invention relates to fruit handling machines, and more particularly to machines for handling such fruit as pineapples.

Pineapples are commonly prepared for canning by trimming each pineapple to form a cylinder of prime quality meat of a diameter adapting the cylinder to a particular can size. Owing to the characteristic shape and the variety of sizes of pineapples, removal of a cylinder from the center of each fruit leaves a hollow cylinder consisting of a layer of meat and an outer layer of shell. The shell is quite hard and rough and contains a large number of eyes. It is customary practice to split the hollow cylinders longitudinally and to flatten the pieces or slabs thus produced onto a conveyor that advances them, meat side uppermost, to and past one or more knives that remove additional meat from the shell. The meat severed from the shell is generally used in the production of shredded pineapple or pineapple juice, depending upon the quality of the salvaged pineapple meat.

Machines thus employed to remove waste shell material from slabs of usable pineapple meat from the hollow cylinders are known in the pineapple canning industry as "eradicators." One of the problems encountered in the design and use of such machines results from the resistance that the knives exert against the pieces of pineapple as the latter are advanced by the conveyors past the knives which have the tendency to stop the pieces while the conveyors continue to move therepast. Consequently, it has been customary to provide the conveyor of a pineapple eradicator with spikes onto which the slabs are pressed, causing the spikes to penetrate the pineapple shell and thus establish sufficiently strong connection between the pieces and the conveyor to enable the latter to present the pieces to the knife or knives, as the case might be, with sufficient force to perform the desired cutting operation.

Such spikes, however, have been found disadvantageous because in penetrating the hard shell on the underside of a slab, they frequently gouge the slabs and break them up into smaller pieces that are apt to encounter the knives in a manner that interferes with their passage past the knives, or in such a manner that the knives fail to sever the edible meat cleanly from the shell. Additionally, the spikes frequently encounter eyes or shell fragments and push the same into the meat to a depth where they are not completely removed by the eradicator knives, thus impairing the quality of the meat salvaged by the machine and complicating the operations of inspecting the meat and removing contaminants therefrom.

An object of the present invention is to provide an improved machine for eradicating shell, or rind, from pineapple meat.

Another object is to provide a pineapple shell eradicator having an improved conveyor for advancing slabs or fragments of pineapple meat and shell to and past eradicator knives to effect severance of the shell from the meat.

Another object is to provide an improved, adjustable mounting for the conveyor of a pineapple shell eradicating machine.

Another object is to provide an improved construction and arrangement of the eradicator knives and of the mechanism for mounting and adjusting the same with relation to the conveyor that advances the pieces of pineapple meat and shell to and past the knives.

Another object is to provide an improved eradicator knife mounting that permits removal of the knives for inspection and sharpening without disturbing a previously attained adjustment, so that after sharpening the knives can be replaced into substantially the same position as before, without requiring readjustment.

Another object is to provide novel means in a pineapple handling machine of the character indicated, to support the shell splitting knife for angular adjustment thereof when an adjustment in the position of the pineapple shell conveyor is made.

These and other objects and advantages of the present invention will become apparent from the following description and the accompanying drawings, in which:

Fig. 1 is a plan of the pineapple handling machine of the present invention.

Fig. 2 is a side elevation viewed in the direction of the arrow 2 of Fig. 1.

Fig. 3 is a fragmentary section taken along lines 3—3 of Fig. 2.

Fig. 4 is a fragmentary longitudinal section taken along lines 4—4 of Fig. 1.

Fig. 5 is an enlarged fragmentary perspective of the conveyor belt used to advance the pineapple in the machine of the invention.

Fig. 6 is a transverse section taken along lines 6—6 of Fig. 2 and shown at an enlarged scale.

Fig. 7 is an enlarged fragmentary detail in section taken along lines 7—7 of Fig. 2.

Fig. 8 is an enlarged fragmentary perspective illustrating the knife mounting of the machine of the invention.

Fig. 9 is an enlarged fragmentary plan of one of the knives of Fig. 8 and the mounting structure therefor.

Fig. 10 is an enlarged perspective of one of the knife positioning levers of the machine of the invention.

The pineapple shell eradicating machine of the present invention is designed to be attached to a pineapple sizing machine of the type employing a rotating cylindrical sizing knife to which whole pineapples are presented with the stem-blossom axes of the pineapples in alignment with the axis of the knife. Each pineapple is advanced past the knife, causing the knife to sever a solid cylinder of pineapple from a hollow cylinder consisting of an outer layer of rind, or shell, and a considerable quantity of edible meat therewithin. The solid cylinder is propelled on through the sizing knife for subsequent coring, end trimming and slicing operations. The hollow cylinder is split longitudinally, permitting it to fall away from the sizing knife in the form of a slab which may or may not fracture into two or more pieces as it is being formed. The splitting knife is so arranged that the slab, whether it be in one or more pieces, falls onto the conveyor of the shell eradicator of the present invention. The eradicator preferably is mounted directly upon the main frame of the sizing machine, in an advantageous position to receive the pieces of pineapple meat and shell, meat side up, onto the conveyor of the eradicator attachment.

The pineapple shell eradicator of the present invention comprises a frame 10 (Figs. 1, 2, 4 and 6) including two elongated side plates 12 and 12a rigidly maintained in spaced, parallel arrangement by a plurality of transverse plates 14, 14a and 14b (Fig. 4). The plates 14a and 14b are conveniently provided by bending into parallel planes the two ends of an elongated plate, the intermediate portion of which extends between the lower edges of the side plates 12 and 12a and thus provides a suitable support 16 for the motor 18 (Fig. 2) that drives the conveyor 20 of the shell eradicating machine of the invention. Openings 22 (Fig. 2) are provided in the side plates 12 and 12a to afford access to the motor 18 which is rigidly secured to the support 16 by bolts 24.

The conveyor 20 comprises a flexible endless belt 26 (Figs. 1, 2, 4 and 6) trained around two cylindrical drums 28 and 28a secured to shafts 30 and 30a, respectively, extending transversely of the frame 10 adjacent the ends of the same. The shaft 30a is journaled in two bearings (not shown) rigidly mounted on the side plates 12 and 12a, while the shaft 30 is journaled in bearings 32 (Fig. 2) that are slidable along suitable ways 34, an opposed pair of which is provided on each side plate 12 and 12a extending longitudinally of the same. Each bearing 32 is adapted to be slid along its ways 34 by an adjusting rod 36 threaded into a socket 38 (Fig. 6) rigid with the associated side plate 12 or 12a. Each adjusting rod 36 is provided with an enlarged head 40 engaging the associated bearing 32 so that by screwing the rods 36 outwardly of their sockets 38, the bearings 32 can be moved in the direction that tightens the conveyor belt 26. Lock nuts 41 carried by the rods 36 can then be tightened against the outer ends of the sockets 38 to secure the parts in adjusted position. A reduced outer end 42 on each adjusting rod 36, extends into a laterally opening recess 43 in the associated bearing 32, within which recess is seated a collar 44 that is secured to the reduced end 42 of the rod 36 by a pin 46, thus providing means for retracting the bearing 32 when the rod 36 is screwed in the opposite direction.

An important feature of the present invention is the constructional detail of the conveyor belt 26. As is best shown in Fig. 5, the belt 26 comprises a flexible backing 52 which may consist of either a single layer of fabric, or a plurality of alternate fabric and rubber or rubberlike laminations. In either case, the under surface of the backing 52 preferably is defined by an exposed layer of fabric, rather than of rubber or rubber-like material, so that the under surface of the backing 52 is characterized by a considerably lower coefficient of friction than would be the case if rubber or rubber-like material were exposed at the under surface of the backing 52.

A thread 54 is vulcanized or otherwise bonded to the upper surface of the backing 52. The thread is composed of rubber or rubber-like material that is somewhat soft and, consequently, is resiliently yieldable. The upper surface of the tread is formed with a multiplicity of spaced, parallel upstanding ribs or beads 56 extending transversely of the belt (Figs. 1, 2 and 4). The ribs 56 considerably enhance the yieldability of the tread 54, since they are capable of bending under load applied to their outer ends. The softness or yieldability of the tread is further increased by a large number of slits or incisions 58 formed at closely spaced intervals in each rib 56 throughout the full width of the belt and in planes extending longitudinally of the belt 26.

The belt 26 is driven in a clockwise direction as viewed in Figs. 2 and 4, by a chain 60 trained around a driving sprocket 62 rigid with the shaft 63 of the motor 18, and around a driven sprocket 64 rigid with the shaft 30a. The chain 60 is maintained under suitable tension by an idler sprocket 65 rotatable on a pin 66 mounted by suitable means (not shown) for adjustment along ways 67 carried by the frame side plate 12a.

The upper run 68 of the belt 26 is slidably supported on a backing table 70 (Figs. 4 and 6) whose upper surface is longitudinally grooved to present a series of laterally spaced ridges or runners 72. The smooth upper surfaces of the ridges 72 are in planar alignment and develop a minimum of friction with the under surface of the upper run 68 of the belt 26 which the backing table 70 maintains in a flat plane during progress of the belt run 68 through the processing portion of the machine. The backing table 70 is supported on a plate 74 extending between the side plates 12 and 12a to which the plate 74 is welded as at 75 adjacent their upper edges (Fig. 6). Studs 76 (Fig. 4) rigid with the backing table 70 extend through the plate 74 and nuts 78 on the studs are tightened against the under surface of the plate 74 to secure the backing table 70 in position.

The frame 10 of the eradicating machine is supported by the frame 80 of the sizing machine 82 by means of a shaft 84 (Figs. 1, 2, 4 and 6) secured at one end in a bracket 86 that is fixedly attached to a wall 88 of the sizing machine to which the axis of the cylindrical sizing knife 90 is perpendicular. Hence, the shaft 84 is disposed parallel to the axis of the sizing knife 90 and is adapted to pivotally support the frame 10 in a position extending laterally from beneath the sizing knife, as clearly shown in Figs. 1, 2 and 4. The shaft 84 is fitted to a bearing tube 92 (Figs. 4 and 6) so that the tube 92 is free to turn on the shaft 84. The tube 92 is welded as at 93 to and extends between the side plates 12 and 12a. The plates 12 and 12a are apertured to accommodate the shaft 84, and an enlarged head 94 on the outer end of the shaft 84 retains the frame 10 against axial displacement from the shaft 84. The bearing tube 92 is disposed adjacent the upper edges of the side plates 12 and 12a and at a distance from the conveyor shaft 30 somewhat less than half the length of the frame 10. The shaft 84 is mounted on the sizing machine 82 in a position lower than and spaced to one side of the sizing knife 90 by a distance somewhat less than the distance between the bearing tube 92 and the shaft 30. Accordingly, the eradicating machine of the invention is pivotally mounted in a laterally extending position with respect to the sizing machine, with the receiving end of the conveyor 20 below the sizing knife 90 (Figs. 1, 2 and 4).

The rear or discharge end of the eradicating machine is supported by a longitudinally adjustable link 100 (Figs. 1, 2, 4 and 6) comprising a rod 102 whose lower end is pivotally connected to the eradicator frame 10 by plates 104 and 106 releasably interconnected by bolts 108 and welded, respectively, to the lower end of the rod 102 and to an end of a horizontal shaft 110 rotatable within a bearing tube 112 rigid with and extending transversely of the frame 10 adjacent the rear end of the same. The upper end of the rod 102 is telescopically received within a tubular clamp 114 (Figs. 2 and 3) depending from a hub 116 pivoted on a stub shaft 118 rigid with a mounting plate 120 secured by bolts 122 to the hereinbefore mentioned wall 88 of the sizing machine. A pin 124 rigid with the portion of the rod 102 within the clamp 114 extends through slots 126 in the clamp, and eyes 128 mounted on the ends of the pin 124 are welded to the lower ends of threaded rods 130 suspended from a plate 132 rigid with the clamp 114. Nuts 134 and 136 on the threaded rods 130, respectively above and below the plate 132, can be manipulated to effect rising and lowering the rod 102 and thus adjust the frame 10 about the axis of the shaft 84. In this manner, the optimum spacing between the sizing knife 90 and the conveyor 20 therebelow can be attained, to assure that the pieces of pineapple meat and shell will drop onto the belt 26 in meat-side-up position. Upon attainment of such adjustment of the frame 10, the clamp 114 should be tightened on the rod 102 by means of a bolt 138 extending through ears 140 projecting from the clamp 114 at opposite sides of a slot 142 in one side wall of the clamp.

A grid assembly 150 (Figs. 1, 2, 4 and 6) rigidly mounted above the conveyor, operates to flatten the pieces of pineapple meat and shell against the belt 26 as the belt advances the pieces and presents them to the eradicating knives 152 and 154 (Figs. 1 and 4) which will be described later herein. The grid assembly 150 is adjustably and removably secured to an upper frame section 156 comprising two parallel plates 158 (Figs. 2, 4 and 6) each of which rises vertically from a strip 160 welded as at 161 thereto. Each of the two strips 160 includes two longitudinally spaced, laterally projecting ears 162 through which cap screws 164 extend into lugs 166 rigid with the associated side plate 12 or 12a, to mount the strip 160 upon the upper edge thereof with the plates 158 disposed vertically and extending longitudinally of the machine.

The grid assembly 150 includes a frame 170 whose configuration is that of a truncated right triangle (Fig. 1) since it is defined by a front transverse bar 172, long and short side bars 174 and 176, respectively, extending perpendicularly from the front bar 172, and an obliquely extending rear transverse bar 178 interconnecting the rear ends of the side bars 174 and 176. The rear edge of the rear bar 178 is bent upward and forward to form a strengthening flange 180 of channel section (Figs. 1, 2, 4 and 6). The grid frame 170 is secured to the upper frame section 156 by bolts 182 (Figs. 2 and 6) extending through horizontally elongated slots 184 in the plates 158 and through vertically elongated slots 186 in flanges 188 welded to and depending from the side bars 174 and 176 of the grid frame 170. Thus, the grid frame 170 is adjustable both vertically and longitudinally, and can be clamped in selected position of adjustment by tightening the bolts 182. Vertical adjustment of the grid frame 170 is facilitated by a plurality of jack screws 189 (Figs. 1, 2, 4 and 6) threaded through the side bars 174 and 176 to bear against the upper edges of the upper frame side plates 158 so as to raise the grid frame 170 when the jack screws 189 are screwed down. Lock nuts 190 are provided on the jack screws 189.

A plurality of grid bars 192 (Figs. 1, 4 and 6), each comprising a vertical blade portion 194 and a horizontal flange 196 adjacent each end thereof, are attached to the grid frame 170 by bolts 198 fastening the flanges 196 to the transverse frame bars 172 and 178. The grid bars 192 are equally spaced throughout the width of the grid frame 170, and the forward ends of the blade portions 194 of the grid bars 192 are tapered on their lower edges as indicated at 200 on Fig. 4. Thus, the lower edges 200 of the blades 194 incline toward the belt 26 from their forward ends 202 to a point approximately mid-way between their ends, from which point the lower edges of the blades extend to the rear ends 204 of the blades parallel with and spaced but a short distance above the belt 26.

The blades 194 are of thin sheet metal, and their forward ends 202 and their inclined lower edges 200 may be somewhat sharpened. Consequently, the blades 194 are adapted to incise the upper meat portions of the pieces of pineapple into elongated strips prior to their being severed from the shell by the eradicator blades 152 and 154.

A splitting blade 212 (Figs. 1, 2 and 4) is adjustably supported from the grid frame 170 in a position adjacent and extending radially from the sizing knife 90. A transversely extending mounting strip 214 of triangular cross section is welded to the front transverse bar 172 of the frame 170, and to the front, inclined face of the mounting strip 214 a stationary leaf 216 of a hinge structure is secured by bolts 218. A movable leaf 220, pivoted to the lower edge of the leaf 216 by a pintle 222, extends forward therefrom. The splitting blade 212 is secured to the movable leaf 220 by studs 223 rigid with the blade 212 and extending through the leaf 220 to receive nuts 224. A plate 226 welded along its lower edge to the leaf 220 projects upward therefrom. Two axially aligned pintle pins 228 are rotatably mounted on the upper edge of the plate 226; and each pintle pin carries an adjusting screw 230 extending through a diametric clearance hole (not shown) in the pin. Each adjusting screw 230 is rotatable relatively to the pintle pin 228 and is secured against axial movement with respect to the same by a head 232 on an end of the screw 230 and a nut 234 threaded onto the screw, between which the pintle pin may be clamped after the desired adjustment of the splitting blade 212 is attained. Each adjusting screw 230 extends radially from its associated pintle pin and is threaded through a diametric hole (not shown) in a pin 236 that is rotatably mounted in and extends between a pair of ears 238 upstanding from the stationary leaf 216. A lock nut 240 is provided on each adjusting screw 230.

By rotating the adjusting screws 230 relatively to the pins 236, the movable hinge leaf 220 can be turned about the pintle 222 to raise or lower the splitting blade 212 relatively to the sizing knife 90. In this manner, and by shifting the grid frame 170 longitudinally, the splitting blade 212 can be adjusted to its most efficient position relative to the sizing knife 90 to accomplish the dual function of splitting the outer layer of meat and shell severed from the sized cylinder of pineapple meat by the sizing knife 90, and of directing the slab of pineapple meat and shell thus formed into the tapering entrance space between the belt 26 and the inclined lower edges 200 of the grid bars 192. This can best be understood by referring to Fig. 4, which shows the blade 212 extending substantially in planar alignment with the sloping lower edges 200 of the grid bars 192 and thus advantageously arranged to guide material being advanced on the belt 26 into position under the grid bars 192.

The shell eradicating knives 152 and 154 are mounted one in advance of the other so that they are engaged successively by each piece of pineapple advanced by the belt 26. The leading knife 152, i.e., the one first to be encountered by advancing material, is spaced somewhat higher than the trailing knife 154. The knife 152 is intended to cut the strips of pineapple issuing from between the grid bars only to such depth that the material severed thereby from the advancing strips consists solely of pineapple meat, substantially uncontaminated by dirt, eyes or other particles of skin, and consequently suitable for use as prime quality crushed pineapple. The material removed by the second knife 154 is more advantageously used for pineapple juice, and accordingly the second knife 154 is set to cut more deeply, where it removes as much of the remaining meat as possible without including so much of the shell that the screens of juicing presses would be apt to become unduly clogged thereby.

Both knives 152 and 154 are arranged parallel to the rear transverse bar 178 of the grid frame 170, and therefore in positions extending obliquely across the conveyor 20 (Fig. 1). The upper edges of the blade portions 194 of the grid bars 192 are stepped down as indicated at 252 (Fig. 4) in a line which likewise is parallel to the rear transverse bar 178. In this manner space is provided to accommodate the blade 152 above the reduced tail portions 254 of the grid bars 192, while the blade 154 is disposed immediately behind the rear ends of the tail portions 254 of the grid bars 192 substantially in alignment with the lower edges thereof.

Since the two knives 152 and 154 are of identical construction, as are likewise the respective mounting and adjusting means for the knives, the following description of but one knife and its mounting and adjusting means will suffice for the purposes of the present disclosure.

As best shown in Figs. 1, 8 and 9, the knife 152 is in the form of an elongated metal strip 260, the forward portion of which is beveled on its under surface as indicated at 262 (Fig. 8) so that the leading portion of the strip 260 can be sharpened to a cutting edge 264. The knife 152 is carried by a cutter bar 266 comprising an elongated rigid body portion 268 of wedge-shaped section, tapering from a somewhat thick rear edge 270 to a thin front edge 272. An upstanding, longitudinally extending rib 274 on the cutter bar 266, is formed with its front face 276 inclining obliquely upward and forward from the upper surface of the portion 278 of the cutter bar 274. Thus is defined a V-shaped socket 280 extending longitudinally of the cutter bar 266 and opening upward and forward to receive the rear edge 282 of the knife, which is of V-shaped section complementary to the socket. The rear edge 282 of the knife 152 fits snugly within the socket 280 when the knife 152 lies flat on the forward portion 278 of the cutter bar.

A pin 286 projects upward from the forward portion 278 of the cutter bar 266 adjacent one end of the body portion 268 thereof. The pin 286 extends through a slot 288 in the knife 152 adjacent an end 290 thereof, and a nut 292 on the threaded upper end of the pin 286 can be tightened against the knife 152 after the knife has been properly positioned on the cutter bar 266. The slot 288 extends obliquely from the end 290 of the knife and toward the rear edge 282 thereof, so that if tension is imposed upon the knife 152 by a force applied at the other end 294 thereof (Fig. 9) the end 290 of the knife 152 will be cammed rearward (assuming that the nut 292 has not been tightened) to seat the corner 296 defined by the end 290 and the rear edge 282 of the knife firmly within the V-shaped socket 280 of the cutter bar 266.

A lever 300 (Figs. 1, 9 and 10) is mounted on the cutter bar 266 for pivotal movement about a pin 302 rigid with and projecting upward from the cutter bar 266 adjacent the other end thereof. The pin 302 is engaged loosely within a longitudinal slot 304 in the lever 300. The slot 304 widened at its rear end which terminates in a wall 306 that extends obliquely toward the inner side edge 308 and the rear end 310 of the lever 300 (see Figs. 9 and 10). A pivot pin 312 rigid with the lever projects downward from the under surface of the lever 300 adjacent the forward end 314 thereof, and fits within a hole (not shown) in the knife 152 adjacent the end 294 thereof, so that when the lever 300 pivots counterclockwise about the pin 302 as viewed in Figs. 1 and 9, the pin 312 imposes tension upon the knife 152 and thus effects camming of the corner 296 of the knife 152 into the socket 280 of the cutter bar through the combined action of the pin 286 and the inclined slot 288, as hereinbefore described.

Pivotal movement of the lever 300 is attained by a screw 316 (Figs. 1 and 9) threaded through an upstanding lug 318 on the lever 300 adjacent the rear end 310 of the lever. An upstanding flange 320 is provided on each end of the cutter bar 266, and the screw 316 can be tightened against the adjacent one of these, as shown in Fig. 9, to impose a torque upon the lever 300 urging it to pivot about the pin 302 and impose tension upon the knife 152. When the corner 296 is seated within the socket 280, the knife 152 can no longer move to the right as viewed in Fig. 9, whereupon continued tightening of the screw 316 will cause the lever 300 to pivot about the axis of the pin 312 at the forward end of the lever 300. In such movement of the lever 300, its intermediate portion where the slot 304 is located, moves to the left as viewed in Fig. 9, causing the sloping end wall 306 of the slot 304 to bear against the pin 302 in such a manner that the lever 300 is cammed rearward relatively to the cutter bar 266, carrying with it the associated end 294 of the knife 152. This effects seating the entire rear edge 282 of the knife 152 within the socket 280 under the overhanging forward face 276 of the rib 274. The nut 292 should then be tightened, as well as nuts 322 and 324 on the pin 302 and the screw 316, respectively, to firmly lock the parts in their operating positions.

A lateral extension 330 (Figs. 1, 2, 6 and 8) of the upper frame section 156 is provided at each side of the same rearwardly of the grid frame 170. Each of these extensions 330 is provided by a short length of channel bar 332 welded at its inner end to the associated frame strip 160 and to the associated upper frame plate 158, a suitable section of which is cut away to receive the channel bar 332. The outer end of each channel bar 332 is closed by a side plate 334 welded thereto, thus defining an inwardly and upwardly opening pocket 336 within which one end of each of the two cutter bars 266 and 266a is received.

As clearly shown in Fig. 1, the two pockets 336 are offset from each other longitudinally of the machine to accommodate the ends of the obliquely extending cutter bars 266 and 266a.

A bracket 340 (Figs. 1, 2, 6 and 8) is attached to each side plate 334 by cap screws 342, and two vertical longitudinally spaced sockets 344 are formed in each bracket 340 (Fig. 7). A pin 346 is mounted in each socket for free rotation and free axial movement relative thereto. An annular recess 348 is provided in each pin 346 adjacent the lower end thereof in position to register with a slot 350 in the outer side of the socket 344 when the pin 346 is fully seated within the socket 344. The slots 350 of the two associated sockets 344 of each bracket 340 are in planar alignment and a single flat key 352 (best shown in Fig. 2) is adapted to enter both slots 350 and seat within the annular recesses 348 of both associated pins 346 to retain the pins within their sockets and still permit free rotation of the pins. The mid-section of each key 352 is enlarged to accommodate a stud 356 rigid with the associated bracket 340, and a wing nut 358 threaded on the outer end of the stud 356 releasably retains the key 352 in pin-retaining position.

The outer face of each of the four flanges 320 of the cutter bars 266 and 266a is horizontally grooved as indicated at 360 to receive a foot 362 extending laterally from a knife holder or barrel 364 carried by one of the pins 346. Each barrel 364 is provided with a vertical bore 366 corresponding in diameter to the associated socket 344. However, the bore 366 terminates short of the top of the barrel 364 and a smaller bore 368 continues from the top of the bore 366 through the top of the barrel, as shown in Fig. 7. The smaller bore 368 is threaded to receive the threaded upper portion 370 of the associated pin 346 which protrudes above the top of the barrel 364 and is provided with a non-circular wrench-receiving portion 372 to facilitate turning the pin 346. Thus it may be seen that each pin 346 and its associated barrel 364 functions as a jack for attaining and maintaining the desired vertical adjustment of one end of one of the cutter bars 266 and 266a as the case might be. Each barrel 364 is rigidly secured to its associated cutter bar flange 320 by a stud 374 rigid with the barrel 364 and extending through the foot 362 thereof and through a horizontally elongated slot 376 in the associated flange 320 to receive a nut 378. By loosening the nuts 378 associated with the flanges 320 on the two ends of one of the cutter bars 266 and 266a, that cutter bar can be adjusted longitudinally of the machine because of the horizontal elongation of the slots 376. When the desired longitudinal adjustment is attained, the nuts 378 should be tightened against the inner faces of the associated flanges 320 to lock the cutter bar in the adjustment thus attained. Similarly, when the desired vertical adjustment of a cutter bar is attained, lock nuts 380 on the threaded portions of the pins 346 should be tightened down against the upper ends of the barrels 364.

Since the pins 346 are retained in the sockets 344 solely by the keys 352, either or both cutter bars 266, 266a can be removed from the machine to permit inspection and sharpening of the knives 152, 154 without disturbing the adjustment of its associated pins 346. Accordingly, upon return of a cutter bar, it will be mounted in precisely the same position as before.

The rear edge of each cutter bar rib 274, 274a is obliquely disposed so that it slopes upward and rearward, as best shown in Fig. 8. Hence the rear face of each rib 274, 274a defines a rearwardly and upwardly opening socket 382, 382a. A first cut discharge chute 384 is mounted in position to receive the pineapple meat severed from the advancing pineapple pieces by the first eradicating knife 152. The forward edge 386 of the chute 384 is seated within the socket 382 of the associated cuter bar 266, being firmly but releasably seated therein by springs 388 (Figs. 1 and 2), one of which is provided on each side of the chute 384. Each spring 388 is under tension between a clip 390 secured by a pin 392 to the associated side of the chute 384 and a clip 394 secured by a pin 396 to an enlarged rear portion 398 of the associated side plate 158 of the upper frame section 156.

A second cut discharge chute 400 (Figs. 4 and 8) is disposed beneath the first cut discharge chute 384, its forward edge being seated within the socket 382a of the cutter bar 266a. The second cut discharge chute 400 is maintained with its forward edge thus seated by being secured to a transverse brace 402 extending between the rear portions 398 of the upper frame plates 158 (Fig. 4).

Preferably a splash shield 404 (Figs. 1 and 4) is pivotally suspended from a pair of brackets 406 carried by the strengthening flange 180 of the rear transverse frame bar 178 of the grid frame 170. The splash shield 404 is urged by gravity into a position (Fig. 4) wherein it is capable of intercepting juice that otherwise would be splashed upward out of the discharge chute 384; however, the shield 404 is so light that pieces of pineapple meat advancing in the chute 384 will raise the shield. The shield thus avoids interfering with discharge of the material within the chute 384.

*Operation*

As hereinbefore explained, slabs of pineapple meat and shell fall from the sizing knife 90 of the sizing machine to which the eradicator of the present invention is attached. Each slab may or may not remain in one piece, but in either event it falls from the rotating knife 90 onto the upper face of the upper run of the belt 26. The splitting blade 212 is so positioned relatively to the sizing knife 90 that the pieces of pipeapple meat and shell thus produced fall onto the belt 26 in meat-side-up position. Even though the pieces of pineapple may not be completely flat the edge of each piece that leads as it is advanced by the moving belt 26 is guided by the downwardly and rearwardly sloping splitting blade 212 into the space below the downwardly and rearwardly sloping lower edges of the blades 194 of the grid bars 192. Since these edges of the grid bars incline toward the upper surface of the belt 26, the piece of pineapple is flattened by the grid bars as the piece penetrates further under the bars. Therefore, as the piece of pineapple progresses further under the grid bars it is pressed down with increasing firmness against the resiliently yieldable tread 54 of the belt 26 which is thus enabled to establish such a secure engagement with the rough pineapple shell on the under surface of the advancing piece that the belt is enabled to propel the piece as the upper meat portion thereof is incised by the blades 194 of the grid bars 192 and to continue to propel the piece of pineapple as it is presented successively to and advanced past the eradicating blades 152 and 152a.

The yieldable quality of the tread 54 is enhanced by the physical form thereof, i.e., the transversely extending ribs 56, each of which is incised by a multiplicity of slits 58, thus presenting a great number of relatively small columns or plugs, some of which may be deformed by the lowermost portions of the rough surface of the pineapple shell while others protrude upward in the indentations in the rough surface to establish an effective keying engagement with the piece of pineapple. In this manner engagement between the pieces of pineapple and the advancing belt 26 is made amply positive to assure advancing of the pineapple pieces past the grid bar blades 194 and past the eradicating blades 152 and 152a.

As hereinbefore mentioned the grid bar blades 194 not only press the pieces of pineapple down against the yieldable tread 54 but they likewise operate to cut the meat portions of the advancing pineapple pieces into elongated strips so that the meat severed from the shell by the blades 152 and 154 is in relatively narrow strips capable of being inspected and handled more readily than would be the case if the meat were severed from the shell in slabs corresponding in size to the pieces of pineapple fed into the eradicating machine of the invention.

The pineapple meat severed from the advancing pieces by the first eradicator blade 152 is propelled into the chute 384 and since the first cut knife 152 is at a considerable elevation above the tread 54 of the belt 26 the meat received on the chute 384 will be substantially uncontaminated by dirt, eyes or other particles of the shell of the pineapple; therefore the meat discharged from the machine in the chute 384 is of prime quality and suitable for canning as crushed pineapple.

The material severed from the shell by the second cut eradicator knife 152a, however, can better be employed in the production of pineapple juice. Hence, the second cut eradicating knife 152a should be considerably closer to the belt 26 so as to sever the greatest practicable quantity of pineaple meat from the shell of the pieces of pineapple supplied thereto without causing such a large quantity of contaminants to pass into the second cut discharge chute 400 that the screens of a pineapple juice expressing machine would be unduly clogged thereby.

While we have explained our invention with the aid of a particular embodiment thereof, it is to be understood that we do not wish to be limited to the specific constructional details illustrated and described, from which departure can be made without departing from the spirit and scope of the invention as defined by the following claims.

Having thus described our invention, what we believe to be new and desire to protect by Letters Patent is:

1. Cutting apparatus comprising a cutter bar, means on the cutter bar defining a forwardly opening socket, a knife having a cutting edge at its forward portion, means on the knife removably receivable within said socket when the knife moves rearward on the cutter bar, a pin rigid with and upstanding from the cutter bar, a lever pivoted at one end to an end of the knife, said lever having therein an obliquely disposed slot into which said pin extends, means engageable with said lever and operable to apply a force to the lever urging a wall of said slot in the lever to bear against the pin and slide rearward thereon and urging the lever to rotate about the pin in the direction imposing tension on the knife, and means movably connecting the other end of the knife to the cutter bar and guiding the same rearward when the knife moves in response to said tension.

2. In cutting apparatus, knife mounting and adjusting means comprising a bracket having a cylindrical socket therein, a pin having an end removably receivable within the socket for free rotation and free axial movement relative to the bracket, means releasably retaining the pin seated at a predetermined position of axial movement relative to the bracket while permitting rotation of the pin, a knife holder threadedly engaged with the pin and supported thereby in spaced relation to the bracket, means disposed on the pin and engageable to adjust the knife holder to a different spacing relative to the bracket upon turning of the pin, and locking means operatively associated with and arranged to releasably retain the pin against rotation relative to the knife holder.

3. A cutting machine comprising a conveyor for advancing material to be cut, a stationary bracket mounted at each of two opposite sides of the conveyor, each of said brackets having therein a socket and a slot entering the socket through a side of the bracket, a pin removably mounted in each socket for free rotation therein and having an annular groove in the circumferential surface of the pin registering with said slot, a key associated with each bracket and extending through the slot thereof and into the groove of the associated pin to secure the pin in predetermined position of axial movement within the socket while permitting free rotation of the pin, each of said pins protruding from its bracket and having threads on the portion of the pin outside the socket, a knife extending transversely of the conveyor, knife holder means rigid with each end of the knife and threadedly engaged on one of said pins, and means disposed on the pins and engageable to adjust the knife to selected spacing from the conveyor upon tuning the pins.

4. A cutting machine comprising a conveyor for advancing material to be cut, a stationary bracket mounted at each of two opposite sides of the conveyor, each of said brackets having therein a socket and a slot entering the socket through a side of the bracket, a pin removably mounted in each socket and disposed therein for free rotation, each pin having an annular groove in the circumferential surface and disposable in registration with a slot, each of said pins protruding from its bracket and having threads on the portion of the pin outside the socket, a knife extending transversely of the conveyor, knife holder means threadedly engaged on each of said pins and secured to the knife, means disposed on said pins and engageable to adjust the knife relatively to the conveyor by turning said pins, and a key associated with each of said brackets and extending through the slot thereof and into the groove of the associated pin to anchor the pin in predetermined position of axial movement in the socket while permitting turning of the pin, said keys being removable from the grooves, said pins being removable from the brackets without disturbing their adjustment relative to said threadedly engaged means upon withdrawal of the keys from the grooves.

5. Cutting apparatus comprising a conveyor adapted to advance material to be cut, two stationary sockets mounted at each lateral side of the conveyor and spaced apart in the direction of advance of the material, a pin associated with each socket, the lower end of each pin being removably and rotatably mounted in the associated socket, the upper ends of the pins being threaded and projecting above the sockets, holder means threadedly engaged on each pin, two cutter bars extending above and transversely of the conveyor and spaced apart correspondingly to said spacing of the sockets, said threadedly engaged holder means being rigid with the cutter bars adjacent the ends of the same, a knife removably mounted on each cutter bar, and a key disposed at each side of the conveyor and arranged to be moved to and from retentive engagement with both associated pins, each of said pins being rotatable within its associated threadedly engaged holder means while engaged by the associated key to effect independent adjustment of the associated knife relative to the conveyor.

6. Cutting apparatus comprising a cutter bar, means on the cutter bar defining a forwardly opening socket, a knife having a cutting edge at its forward portion and a slot adjacent one end, said slot extending obliquely away from said one end of the knife and toward the rear edge thereof, holding means on the knife removably receivable within said socket upon rearward motion of the knife relative to the cutter bar, a pin upstanding from the cutter bar and projecting into said slot in the knife, fixed pivot means on said cutter bar adjacent the other end of said knife and rearwardly thereof, a lever pivotally connected to said other end of said knife and having a slot within which said fixed pivot means is received and having a sloping end wall engageable with the fixed pivot means, and means engaging said lever when an edge of said knife slot engages said pin and said sloping end wall engages said fixed pivot means and arranged to move said lever thereby applying substantially uniform force adjacent both ends of said knife rearwardly thereof.

7. In a pineapple treating machine, a sizing knife of circular cross section, a conveyor adjacent said sizing knife arranged for adjustment toward and away from the same, a bar associated with said conveyor in spaced relation thereto and arranged for movement with said conveyor, a splitting blade between said sizing knife and said bar, means associated with said splitting blade and arranged to pivotally attach the same to said bar for movement of said splitting blade toward and away from said conveyor about an axis substantially parallel to the axis of said sizing knife, and means connected between said splitting blade and said bar and arranged to bring said splitting blade into adjusted position extending substantially radially of said sizing knife.

8. In a pineapple treating machine, a sizing knife of circular cross section, a conveyor arranged for adjustment toward and away from said sizing knife, a bar associated with said conveyor in spaced relation thereto and arranged for movement with said conveyor, a splitting blade between said sizing knife and said bar, means pivotally attaching the splitting blade to said bar for movement toward and away from said conveyor about an axis substantially parallel to the axis of said sizing knife, means connected between said conveyor and said bar and arranged to vary the spacing of said bar with respect to said conveyor, and means connected between said splitting blade and said bar and arranged to bring said splitting blade into adjusted position extending substantially radially of said sizing knife.

9. In a pineapple treating machine, a sizing knife of substantially circular cross section, a conveying surface adjacent said sizing knife and arranged for adjustment toward and away from the sizing knife, a frame associated with said conveying surface in spaced relation thereto and arranged for movement with said conveying surface toward and away from said sizing knife, a plurality of grid bars fixed to said frame, said grid bars being inclined along their lower edges from one end adjacent said sizing knife away from the same and downward toward said conveying surface, a splitting blade, means pivotally attaching said splitting blade to said frame adjacent said one end of said grid bars between said frame and said sizing knife for movement of said splitting blade toward and away from said conveying surface about an axis substantially parallel to the axis of said sizing knife, and means connected between said splitting blade and said frame and arranged to bring said splitting blade into a position substantially radial with respect to said sizing knife.

10. In a pineapple treating machine, a substantially cylindrical sizing knife, a conveying surface arranged for adjustment toward and away from the sizing knife, a frame associated with said conveying surface in spaced relation thereto and arranged for movement with said conveying surface toward and away from said sizing knife, a plurality of grid bars fixed to said frame, said bars being inclined along their lower edges from one end adjacent said sizing knife away from the same and downward toward said conveying surface, a splitting blade, means pivotally attaching said splitting blade to said frame between the frame and the sizing knife for movement of said splitting blade toward and away from said conveying surface about an axis substantially parallel to the axis of said sizing knife, means operably associated with said frame and arranged to vary the spacing of said frame with respect to said conveying surface to change the spacing of said grid bars with respect to said conveying surface, and means connected between said splitting blade and said frame and arranged to bring said splitting blade into a position extending substantially radially of said sizing knife to guide pineapple pieces on said conveying surface beneath said grid bars.

References Cited in the file of this patent

UNITED STATES PATENTS

| | | |
|---|---|---|
| 807,571 | Morterud | Dec. 19, 1905 |
| 958,743 | Gromme | May 24, 1910 |
| 1,369,231 | Fisher | Feb. 22, 1921 |
| 1,844,810 | Taylor | Feb. 9, 1932 |
| 1,929,586 | Holland-Letz | Oct. 10, 1933 |
| 1,941,957 | Stegmann | Jan. 2, 1934 |
| 2,433,730 | Bridge | Dec. 30, 1947 |
| 2,467,158 | Schoening | Apr. 12, 1949 |
| 2,784,835 | Dixon | Mar. 12, 1957 |

FOREIGN PATENTS

| | | |
|---|---|---|
| 153,508 | Australia | Oct. 2, 1953 |